United States Patent [19]
Pannullo et al.

[11] 3,908,458
[45] Sept. 30, 1975

[54] OPEN CHANNEL FLOW MEASURING DEVICE

[75] Inventors: Louis A. Pannullo, Waterbury; Donald D. MacKenzie, Middlebury, both of Conn.

[73] Assignee: American Chain & Cable Company, Bridgeport, Conn.

[22] Filed: Nov. 12, 1973

[21] Appl. No.: 415,137

[52] U.S. Cl. .................................. 73/198; 73/228
[51] Int. Cl.² .................... G01F 1/28; G01F 15/12
[58] Field of Search ........................... 73/228, 198

[56] References Cited
UNITED STATES PATENTS

| | | | |
|---|---|---|---|
| 530,337 | 4/1894 | Grover | 73/198 |
| 2,501,705 | 3/1950 | Beggs | 73/228 |
| 3,098,384 | 7/1963 | Nusbaum | 73/228 |
| 3,338,093 | 8/1967 | Usry et al. | 73/228 X |
| 3,340,733 | 9/1967 | Lasher | 73/228 |

*Primary Examiner*—James J. Gill
*Attorney, Agent, or Firm*—Pennie & Edmonds

[57] ABSTRACT

A flow velocity measuring device is disclosed which includes a probe capable of measuring flow velocity at a selected depth in a flowing liquid whose height may vary. Flow velocity is indicated by a read out device. A control circuit is responsive to the depth sensing device for controlling the probe depth within a desired range. The position of the probe is detected by a sensor and is indicated by any suitable read out device, such as a meter. A recorder may also be provided for continuously recording the probe position and the flow velocity.

17 Claims, 11 Drawing Figures

OPEN CHANNEL FLOW MEASURING DEVICE

BACKGROUND OF THE INVENTION

Over the past few years, there has been growing concern over the pollution of the environment. One of the primary areas of public concern has been the pollution of our water resources by the effluent of sewage treatment systems. Such pollution can usually be prevented by the proper operation of the sewage treatment facility. Studies have even shown that the level of pollutants expelled from a properly operating plant is often significantly below that of the body of water into which discharge is made.

In order to obtain an accurate picture of the operation of a sewage treatment system, it is often desirable to be able to measure the rate of flow of sewage through the various municipal lines that lead to the plant. Measuring the rate of flow allows one to determine the volume of sewage entering a plant. There are a number of prior art techniques for making such measurements.

Some of these techniques essentially involve the use of a device for measuring the height of the sewage. Knowing the height of the sewage and the characteristics of the sewer line will then enable one to roughly calculate the rate of flow. Methods for measuring the height of the sewage usually involve the use of a float which floats on top of the surface of the flowing sewage in the channel. Alternatively, a bubbler could be placed at the bottom of the sewage line and the height of the sewage measured by sensing the bubbler back pressure.

However, such devices do not yield satisfactory results. Such common conditions as sewer lines filling up, backing up, or even flowing backwards result in totally erroneous information. Moreover, such failures occur at a time when conditions are most critical and the need for accurate information is most acute. It is also noted that even when such devices are operating properly, variations in the characteristics of the sewage and conditions at various points upstream and downstream will adversely affect the accuracy of readings. It is still further noted that such techniques will not work where the nature of the channel is such that there is no relationship between height and the rate of flow, such as sewer junctions.

Alternative approaches involve the measurement of the velocity of the sewage at the surface and the height of the sewage in the line. This information, together with the dimensions of the sewer line, yields a more accurate indication of the rate of flow of sewage through a sewer channel. Techniques employed to measure the velocity of the sewage at the surface include the use of a paddle-wheel or an electro-mechanical flexure assembly coupled to a sensor arm that is supported with its end immersed in the sewage. See, for example, U.S. Pat. No. 3,098,384. Although such systems do present some advantage over earlier systems, they suffer from the unreliability of surface velocity as a reference from which to measure the velocity of flow of sewage through the conduit.

Furthermore, the techniques of measuring the height of sewage and the measurement of height and surface velocity yield grossly inadequate results in many commonly occuring points in a sewage treatment system. Thus, where there are underground storage basins, pumping stations, sewer junctions, or the like, which are all very commonly used in medium to large municipal systems, no existing method will give satisfactory results.

Another primary problem inherent in all these systems is the tendency of flow velocity to vary as a function of depth. This variation will depend upon a number of factors including the viscosity of the sewage and the properties of the pipe. A very accurate picture of the rate of flow of sewage through a channel would require a profile of sewage velocity as a function of depth. The prior art devices are generally incapable of reading velocity as a function of depth in an accurate manner.

SUMMARY OF THE INVENTION

In accordance with the present invention, a far superior apparatus for the measurement of the rate of flow of sewage through a conduit is provided. It is known that the rate of flow varies as a function of position in the cross-sectional field defined by the plane perpendicular to the direction of flow, with the lower velocities generally in the periphery of the field. The inventive channel flow measuring device uses a probe for measuring sewage flow velocity, at a point below the surface of the flowing sewage. The ability to measure the velocity below the surface of the sewage is significant in that the velocity of the flow of sewage below the surface is a much more reliable parameter from which to gauge the overall rate of flow.

The probe comprises a target supported at the end of an arm. The arm is supported by a flexible member, allowing displacement of the target in response to the velocity of the flowing sewage. The arm and flexible member are contained in a housing, with the end of the arm that supports the target extending from the housing. A strain measuring bridge is mounted on the flexible member and produces a signal indicative of the flow velocity. The housing isolates the arm and the flexible member from the flowing sewage, thereby performing the function of making the measurement equipment responsive only to the sewage impinging upon the target. This enables the probe to measure flow velocity below the surface.

The probe also includes a bubbler outlet and a device for sensing bubbler back pressure, thereby indicating the depth of the probe in the sewage. This system is cleaned regularly by blowing air at high pressure through the bubbler outlet. Further cleaning is accomplished by blowing air at high pressure between the housing and the target and clearing any accumulated debris by withdrawing the probe through a wiper sleeve.

The probe is mounted on a platform which can be raised and lowered on a supporting rail by an electrical chain hoist. By varying the depth of the probe, it is possible to obtain a picture of sewage flow velocity as a function of depth. Such a profile of flow velocities gives a very complete and accurate picture of the operation of the sewage line.

Additionally, a control circuit is provided which will automatically adjust the position of the probe to maintain it at any selected depth, thereby providing a continuous picture of the rate of flow of sewage through the conduit being measured. It has been found that placement of the target about six inches below the surface yields best results. The control system is responsive to the bubbler back pressure to maintain the probe at the desired depth. The control system may be an electrical or pneumatic circuit. When the probe is being automatically maintained at a given depth, it is thus possible to take the indicated velocity and probe position information and calculate the height of the sewage as well as the rate of flow of sewage through the channel.

DETAILED DESCRIPTION OF THE PREFERRED EMBODIMENT

Referring to FIGS. 1–5, the inventive probe assembly includes a target 1, which serves as a flow sensing member, connected to a flexible beam 2, which comprises an arm 3 coupled to a flexure member 5 by a plug 6. Plug 6 is fitted into arm 3 and contains a tapped hole for receiving flexure member 5. Beam 2 is isolated from the sewage flow by a housing 7 whose top is commonly supported with and secured to the top of beam 2. The bottom of housing 7 is contiguous with target 1. There is a clearance of approximately 0.010 inches between the target and the housing. Top surface 9 of target 1 is concave in order to accommodate the displacement of the target and flexure of the beam in response to the force or drag exerted by sewage flowing past the target. The shape of top surface 9 results in movement of the target without substantially affecting the clearance between target 1 and housing 7. Arm 3 is a hollow tube and is secured to target 1 by a plug 11, which receives a bolt 13. A washer 15 is mounted on bolt 13 and secured thereto by a pair of nuts 17. Target 1 rests on washer 15. A sleeve 19 is secured around arm 3 a small distance above target 1. A spring 21, disposed around arm 3, bears against sleeve 19 and the top surface of target 1. Spring 21 biases target 1 towards washer 15 and thereby allows the position of target 1 relative to housing 7 to be varied by adjustment of nuts 17.

Figure 1A:
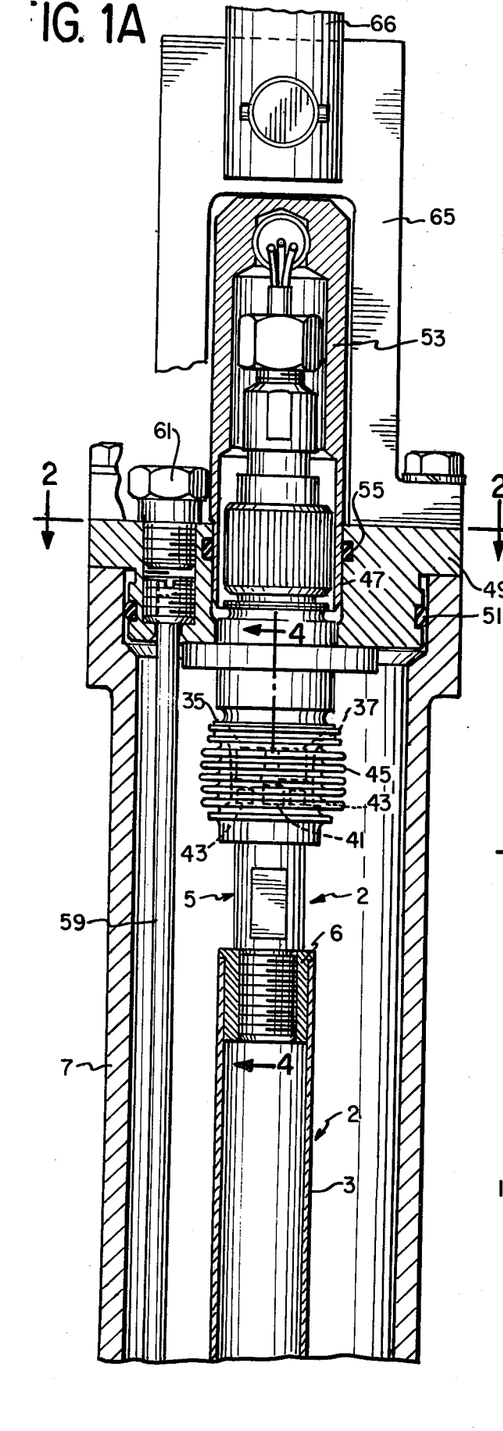
FIGS. 1A and 1B together illustrate an open channel flow measuring probe constructed in accordance with the present invention.
Figure 1B:
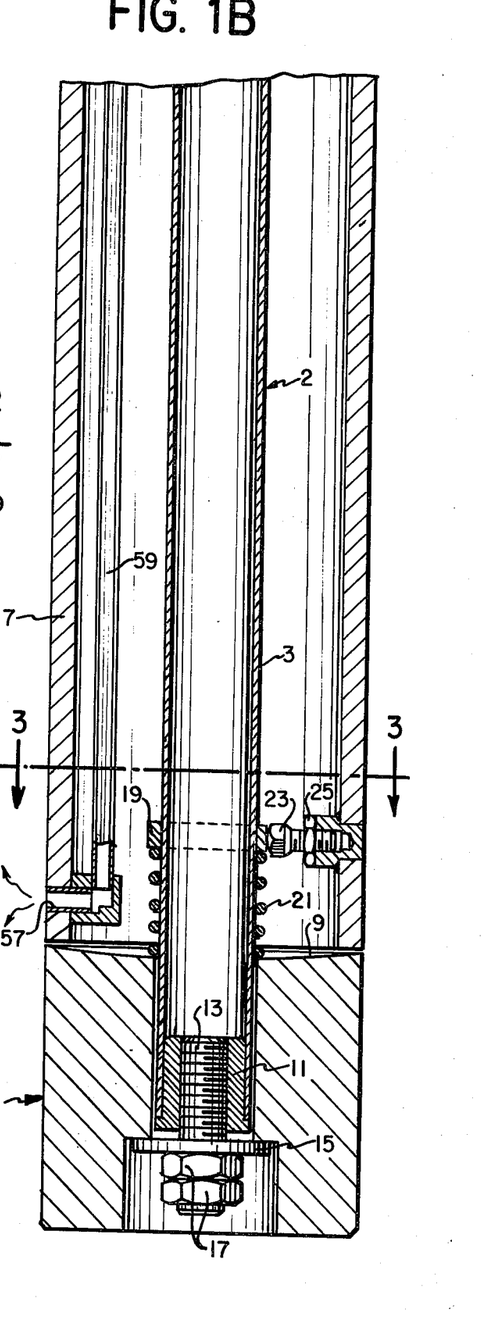

The deflection of arm 3 is limited by four screws 23, which serve as adjustments. These screws are radially mounted on the sidewalls of the housing in line with sleeve 19. Due to the fact that the passage of sewage around target 1 will seldom cause a drag exceeding four pounds, it has been found desirable to adjust the screws 23 by exerting a five pound force against the target in the direction of the screw to be adjusted and adjusting the screw to be flush with sleeve 19. This operation is separately carried out on all four of the stop adjustment screws 23. The screws are then locked into position by nuts 25, which are mounted on the screws.

Figure 3:
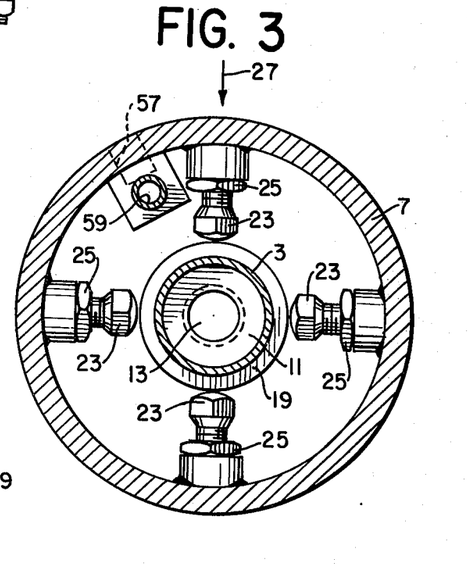
FIG. 3 is a view along line 3—3 of FIG. 1.
Figure 4:
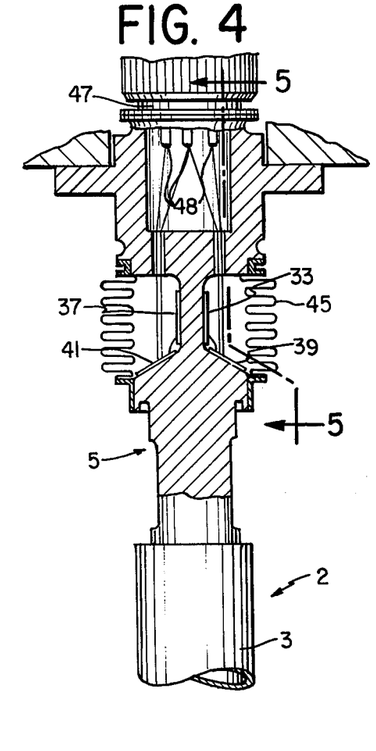
FIG. 4 is a cross-sectional view along line 4—4 of FIG. 1.
Figure 5:
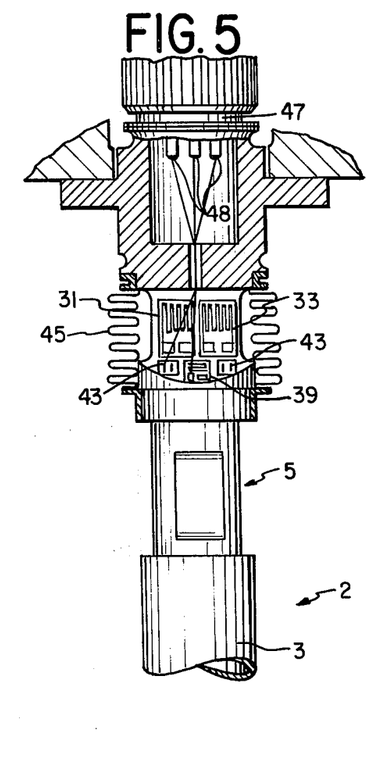
FIG. 5 is a cross-sectional view along line 5—5 of FIG. 4.

Flexure member 5, which is made of a resilient material and includes a central portion that is tapered inwardly to present a relatively flat, thin, and flexible planar surface perpendicular to the direction of flow indicated by arrow 27 in FIG. 3, is flexed when target 1 is displaced by the flow of sewage. As shown in FIG. 8B, four conventional strain gauges 31, 33, 35, and 37, which together with resistors 39 and 41 form a strain measuring bridge, are used to measure the magnitude of the displacement. Soldering terminals 43 are provided in order to facilitate wiring of the bridge. The strain gauges are protected by a bellows housing 45. The strain gauges are provided with current through resistors 39 and 41 by two terminals of an electrical connector 47, which has four terminals 48. The other two terminals of electrical connector 47 are used to convey the output signal of the bridge to the indicating apparatus. Housing 7 is sealed by a plug 49 and an O-ring 51. Four conductor electrical connector 47 is held in a housing 53, which is maintained in sealing engagement with plug 49 and an O-ring 55.

The depth of the probe in the sewage is sensed by bubbling air through outlet 57, which is located on housing 7, and sensing the bubbler back pressure. The bubbler outlet is placed on the upstream side of the probe at a point about 35 degrees from the direction of flow as indicated by arrow 27. This is done in order to minimize the effects of flow velocity on bubbler back pressure. Air is supplied to the outlet 57 by conduit 59 in housing 7, which in turn is supplied with air through pneumatic inlet 61 in plug 49.

In order to keep the bubbler outlet clean, the bubbler may be periodically subjected to relatively high air pressures. This has been found to be an effective method of blowing away debris which accumulates in the outlet. Also, it has been found desirable to apply that relatively high pressure when the sensed back pressure in noncharacteristically high, insofar as such non-characteristically high pressures are usually indicative of outlet clogging.

Figure 2:
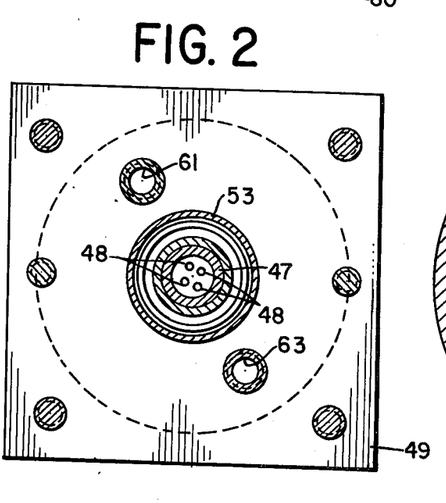
FIG. 2 is a cross-sectional view along line 2—2 of FIG. 1.

Referring to FIG. 2, plug 49 is also provided with an inlet 63 for forcing gas at high pressure through the cavity between housing 7 and arm 3 and out into the sewage through the clearance between target 1 and housing 7. This is done periodically and simultaneously with the pneumatic cleaning of bubbler outlet 57 and has been found to be an effective method of keeping the clearance between target 1 and housing 7 free of debris and operating properly.

Figure 6A:
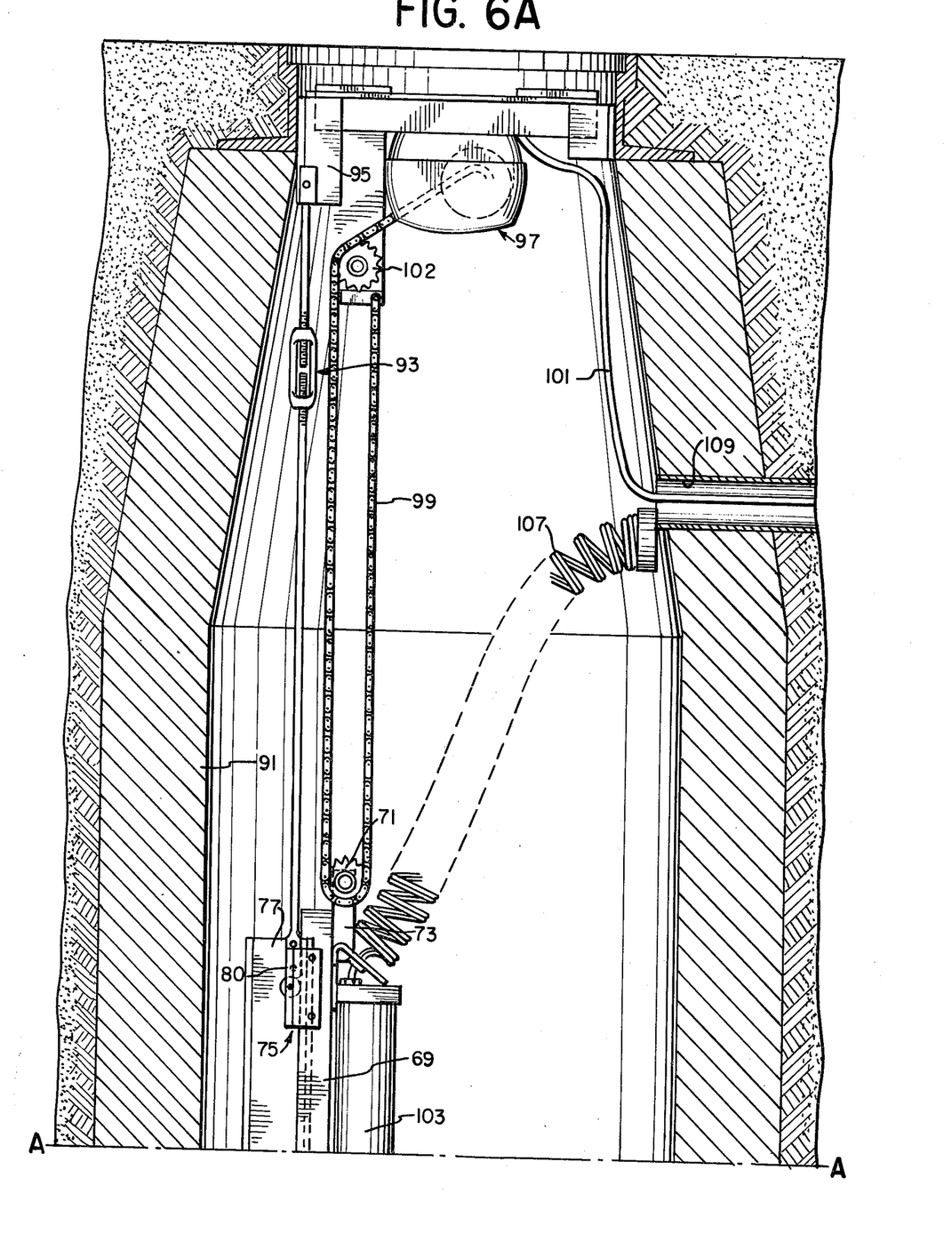
FIGS. 6A and 6B together illustrate a typical installation of an open channel flow measuring system constructed in accordance with the present invention.
Figure 6B:
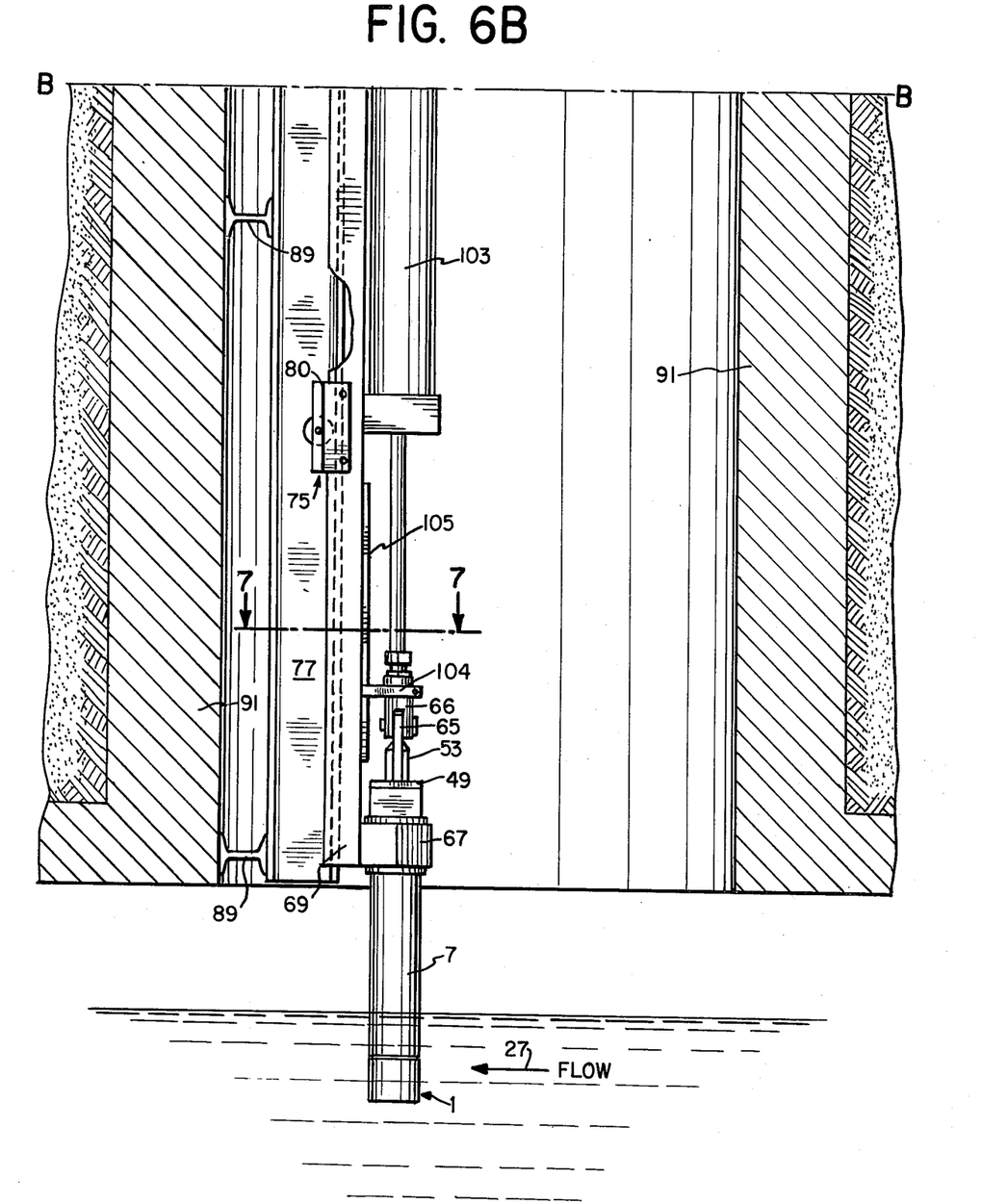
Figure 7:
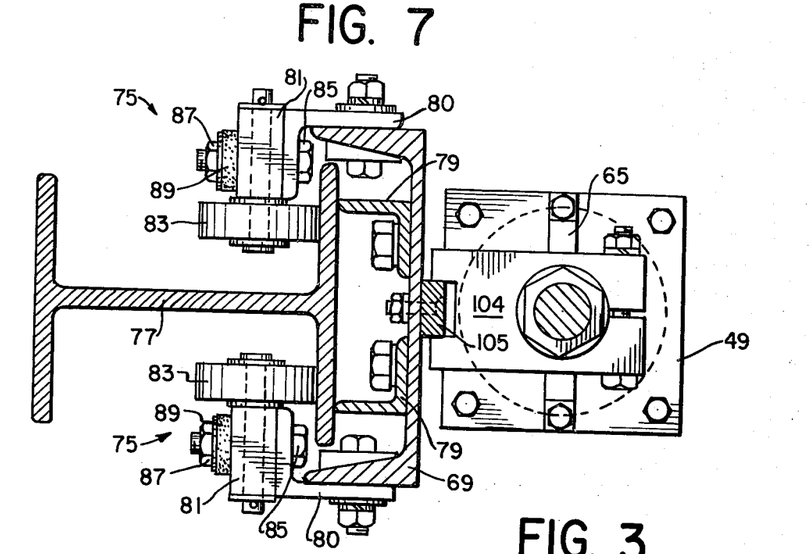
FIG. 7 is a cross-sectional view along line 7—7 of FIG. 6.

Referring to FIGS. 6-7, a bracket 65, a clevis 66, and a wiper sleeve 67 are secured to a platform 69, which is mounted for vertical movement. While the bracket, clevis, and sleeve are primarily provided for cleaning the housing and target, they also perform the function of supporting these elements. A gear 71 is rotatably mounted on a plate 73, which is secured to platform 69. Motive power for moving the platform up and down is coupled to gear 71. Wheel assemblies 75 support platform 69 and allow it to move up and down on a rail 77.

The platform is slidably supported on the rail by wheel assemblies 75. The platform slides on rail 77 on a pair of skis 79, which extend the length of the platform. The skis are bolted to the underside of platform 69. Brackets 80 support wheel assemblies 81 on platform 69. Wheels 83 are mounted on axle assemblies 81 and maintain the skis in engagement with rail 77. Bolts 85 and nuts 87 cause rubber washers 89 to bias the axle assemblies toward the brackets 80, thereby making the wheels engage rail 77. Rail 77 is held in place by suitable supports 89, which may, for example, be secured to the casing 91 of a manhole. The rail is also supported by a turn buckle arrangement 93, which is secured to a plate 95 and rail 77.

The depth of target 1 in the sewage is varied by a hoist 97, which takes in and lets out a chain 99, which is coupled to gear 71, thereby raising and lowering platform 69. Hoist 97 is activated by pulses sent over a cable 101. In the preferred embodiment these pulses have a duty cycle of 0.3 seconds on and 3 seconds off to the contactor in the hoist. The use of pulses is desirable because it averages out the effects of turbulence and reduces the duty cycle of the motor. Pulsing also decreases the hoist's incremental movement, permitting more accurate positioning. The hoist either pays out or takes in chain 99, which is guided by a gear 102, thereby raising and lowering the platform 69 along with the sensing apparatus secured to it. The hoist can be any standard mechanical operator, such as the Acco-Wright hoist, model WRC-66. This hoist includes a pair of limit switches to limit its range of operation, and these switches may be adjusted to the limits of the channel dimensions as an added safety factor. The hoist is modified by the coupling of a ten turn potentiometer to its geared limit switch assembly, thereby allowing the position of the hoist to be sensed by the potentiometer.

When is is desirable to clean the surface of the housing 7 and target 1, they are withdrawn through wiper sleeve 67 by actuation of a pneumatic cylinder 103. During withdrawal through wiper sleeve 67, the probe is guided by a guide 104, which mates with a track 105. In the preferred embodiment, wiping is performed periodically and simultaneously with the cleaning of bubbler outlet 57 and the clearance between housing 7 and target 1. The electrical connections from connector 47, as well as the actuating source for the pneumatic cylinder 103, are sent over a cable 107, where they meet cable 101, which comes from the hoist. These two cables go through a conduit 109 to a remote point.

Figure 8A:
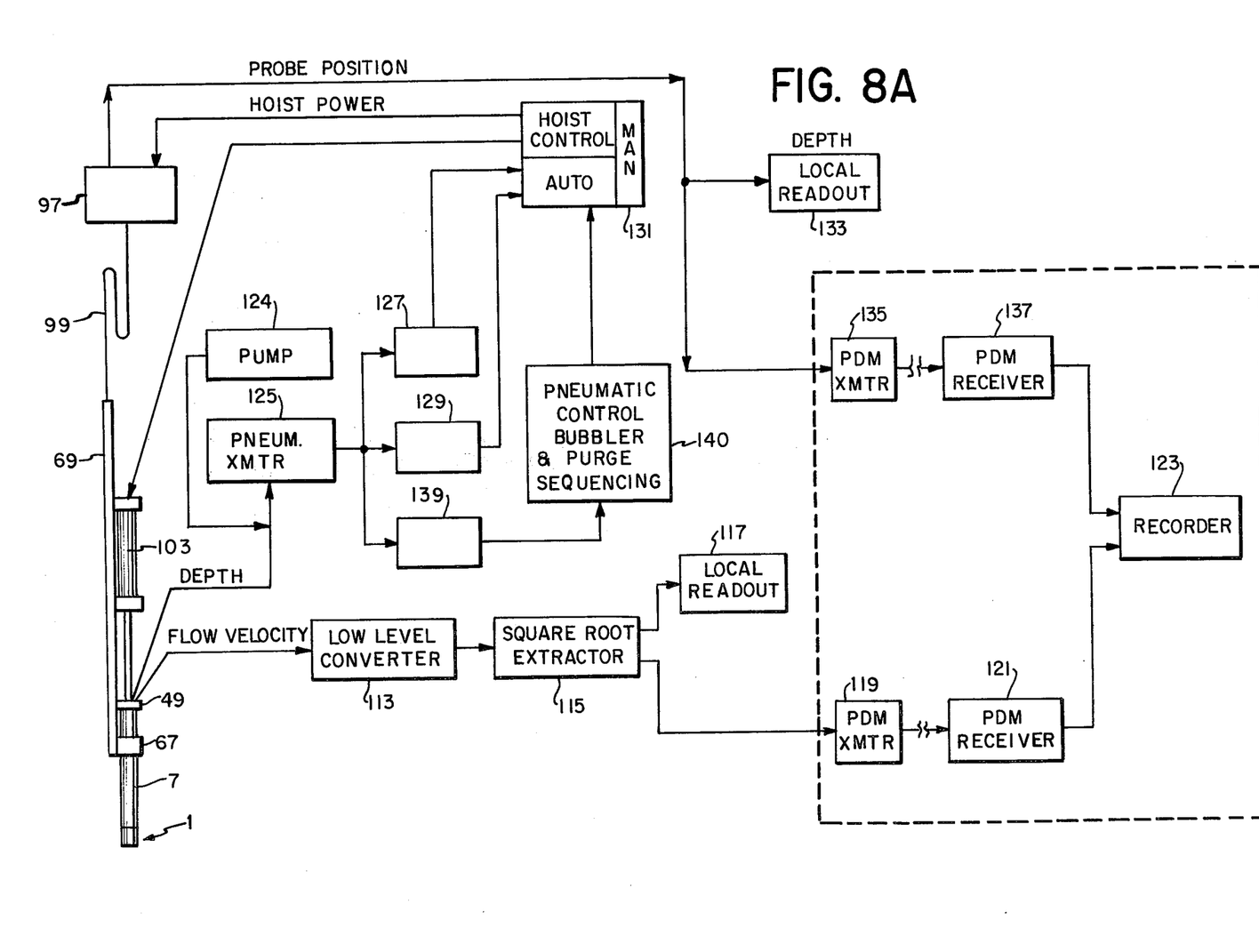
FIG. 8A is a block diagram of the control system for a flow measuring device constructed in accordance with the present invention.
Figure 8B:
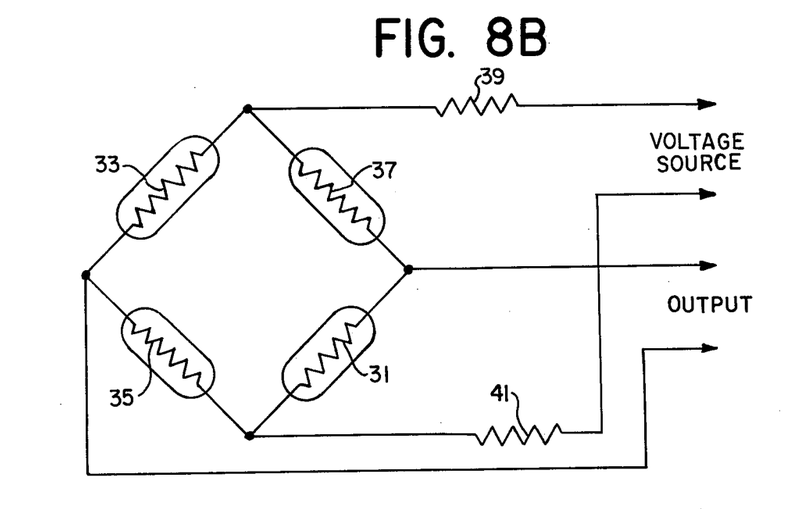
FIG. 8B is a detail showing the electrical arrangement of the strain bridge.

Referring to FIGS. 8A and 8B, the output of the strain gauge bridge comprising strain gauges 31, 33, 35, and 37 is fed to a low level converter 113, which simply amplifies the bridge output. As the moving stream impinges on target 1, the drag developed is proportional to the square of the velocity of the stream. The drag causes a linear deflection of flexure member 5, which is detected by the strain gauges. In order to convert the voltage output of low level converter 113 into a signal which is linear as a function of velocity, it is necessary to feed this signal to a square root extractor 115. The output of the square root extractor 115 can then be sent to any suitable local read out device 117, such as a meter. It is also possible to send this signal to a pulse data modulation transmitter 119, which tramsmits the signals to a remote point where they are received by a receiver 121 and recorded by a recorder 123. If it is desired, the probe may be manually raised and lowered to obtain a profile of stream velocity as a function of depth.

The bubbler outlet 57 is supplied with air by a pump 124. The pressure supplied to the bubbler outlet is coupled to a pneumatic amplifier 125, such as a Bristol model 609 pneumatic amplifier. This output is fed, in the automatic mode, to a pair of pressure sensitive switches, namely high level limit switch 127 and low level limit switch 129. Switches 127 and 129 are responsive to pressure to close a pair of electrical terminals and may be of any suitable type, such as a Bristol B 2060.

In the preferred embodiment, the probe is made to automatically seek a level of 2 inches of water back pressure. This is equivalent to a depth of 6 inches because the bubbler outlet is about 4 inches above the center of the target. The high limit switch 127 is therefore set to activate at a pressure of 1¾ inches of water pressure, and the low limit switch 129 at a pressure of 2¼ inches of water back pressure at the input to pneumatic amplifier 125. Although the deadband of the limit switches could be narrowed, turbulence would cause continual hunting around the control point. The terminals of switches 127 and 129 are coupled via a control unit 131 to the raising and lowering control inputs of the hoist 91. Thus, if switch 127 is activated, the hoist is lowered, while if switch 129 is activated, the hoist is raised. In this manner, the target is maintained at the desired depth of 6 inches.

Control unit 131 is responsive to the outputs of switches 127 and 129 to provide a pulse output to hoist 91. This, in the automatic mode, maintains the target 91 at the desired depth. Alternatively, the automatic function may be overridden and the hoist operated manually to provide a profile of velocity as a function of depth.

The output of the potentiometer coupled to the geared limit switch assembly of the hoist is used as an indication of position and can be sent to a suitable local read out device 133, such as a simple d'Arsonval meter. The signal can also be sent to a pulse data modulation transmitter 135, which realys it to a remote pulse data modulation receiver 137, which in turn sends the information to a recorder 123. The position of the probe is an indication of the height of the sewage in the channel when the probe is in the automatic mode. The height of the sewage can then be combined with the flow velocity to get an indication of the rate of flow of sewage.

Control unit 131 is responsive to a third pressure sensitive switch 139, which is activated should bubbler back pressure rise to above 5 inches of water. This indicates that the bubbler is clogged and initiates a cleaning cycle by actuation of a cleaning control unit 140. However, even without the bubbler clogging, the cleaning cycle will be executed by the pneumatic control bubbler and purge sequencing unit 140. In the preferred embodiment, this is done every 15 minutes. Such purge sequencing will therefore occur every 15 minutes, or any other convenient interval, or whenever the bubbler clogs. During the cleaning cycle, the bubbler feed and pneumatic transmitter are valved off. For a short period of time, air is forced at 50 psi through the bubbler outlet 57 and also between target 1 and housing 7. Simultaneously, pneumatic cylinder 103 begins to pull the probe through wiping sleeve 67. After the housing 7 and target 1 have been wiped, the probe is then returned to its normal position. During the cleaning cycle, the hoist is disabled. After cleaning, the probe is again put in service measuring flow velocity and position.

I claim:

1. A liquid flow velocity measuring apparatus, comprising:

a. first support means;
b. flow sensing means mounted on said first support means, positionable at a selected level in a flowing liquid for exposure to said flowing liquid and responsive to the velocity of said flowing liquid;
c. isolation means secured to said first support means for isolating said flow sensing means from the flow of the liquid at levels other than said selected level while exposing it to said flowing liquid at said selected level;
d. velocity sensing means for sensing displacement of said flow sensing means, said first support means, flow sensing means, isolation means, and velocity sensing means forming a probe for immersion in said flowing liquid;
e. bubbler outlet means mounted on said probe for expelling air into said flowing liquid;
f. conduit means for feeding air to said bubbler outlet means; and
g. means for sensing the developed back pressure in said conduit as an indication of depth.

2. Apparatus as in claim 1, wherein said flow sensing means is a target presenting a surface for exposure to said flowing liquid, and said first support means is a beam, said target secured to the bottom end of said beam.

3. Apparatus as in claim 2, further comprising:
a. slidable support means for supporting said probe;
b. means for indicating said sensed velocity;
c. means for detecting the position of said probe;
d. means for indicating said position; and
e. a hoist for raising and lowering said slidable support means to a number of positions allowing successive readings of position and velocity to be taken to form a profile of liquid velocities.

4. Apparatus as in claim 3, wherein said beam is deflectable and further comprising at least one strain measuring device secured to said beam.

5. Apparatus as in claim 2, further comprising:
a. second support means;
b. slidable support means for supporting said probe and varying the position of said probe, said slidable support means being slidably supported for vertical movement on said second support means;
c. means for displaying the output of said velocity sensing means as an indication of velocity;
d. means for detecting the position of said probe;
e. means for indicating said position; and
f. a hoist for raising and lowering said slidable support means to a number of positions allowing successive readings of position and velocity to be taken to form a profile of liquid velocities.

6. Apparatus as in claim 5, further comprising a control circuit responsive to bubbler back pressure for actuating the hoist to maintain said target at a desired depth.

7. Apparatus as in claim 5, wherein said beam is deflectable, and said isolation means is a hollow housing which contains said beam, the upper end of the housing being secured to the upper end of the beam.

8. Apparatus as in claim 7, wherein said sensing means comprises at least one strain measuring device secured to said deflectable beam.

9. Apparatus as in claim 7, wherein the top of the target is concave to maintain a substantially uniform clearance between the lower end of said housing and the upper surface of said target during the displacement of said target.

10. A liquid flow velocity measuring apparatus, comprising:
a. a beam;
b. a target mounted on said beam, positionable at a selected level for exposure to said flowing liquid and responsive to the velocity of said flowing liquid;
c. isolation means secured to said beam for isolating said target from the flow of the liquid at levels other than said selected level while exposing it to said flowing liquid at said selected level;
d. velocity sensing means for sensing displacement of said flow sensing means, said beam, target, isolation means, and velocity sensing means forming a probe for immersion in said flowing liquid;
e. bubbler outlet means mounted on said probe for expelling air into said flowing liquid;
f. conduit means for feeding air to said bubbler outlet means;
g. means for sensing the developed back pressure in said conduit as an indication of depth; and
h. purge means for expelling air at relatively high pressure through said bubbler outlet means and between said isolation means and said target to remove accumulated debris from said bubbler outlet means and from between said isolation means and said target.

11. Apparatus as in claim 10, further comprising:
a. second support means;
b. sleeve means mounted on said second support means and disposed around said probe for wiping said probe; and
c. means secured to said probe and said second support means for moving said probe through said sleeve means.

12. Apparatus as in claim 11, further comprising means for actuating said purge means and said means for moving said probe through said sleeve means at regular intervals and also in response to a back pressure in excess of a fixed threshold value of back pressure.

13. A liquid flow velocity measuring apparatus, comprising:
a. hoist means;
b. probe means for sensing flow velocity at a selected depth in said flowing liquid;
c. support means, coupled to said hoist means, for supporting said probe means;
d. bubbler means attached to said probe means for measuring the depth of said probe means;
e. control means responsive to said bubbler means for controlling said hoist to maintain said probe at a selected depth;
f. means for generating periodic signals;
g. means for generating a non-periodic signal in response to an uncharacteristically great depth measurement; and
h. means for removing accumulated debris from the probe in response to said periodic signals and said non-periodic signals.

14. A liquid flow velocity measuring apparatus, comprising:
a. hoist means;
b. probe means for sensing flow velocity at a selected depth in said flowing liquid;

c. support means, coupled to said hoist means, for supporting said probe means;

d. measuring means attached to said probe means for measuring the depth of said probe means;

e. control means responsive to said measuring means for controlling said hoist to maintain said probe at a selected depth;

f. a high limit switch, acutated by said measuring means when the probe means is above a selected high limit, for actuating said hoist means to lower said support; and g. a low limit switch, actuated by said measuring means when the probe means is below a selected low limit, for actuating the hoist to raise said support.

15. A liquid flow velocity measuring apparatus, comprising:

a. a deflectable beam;

b. a target mounted on said beam, positionable at a selected level in a flowing liquid for exposure to said flowing liquid and responsive to the velocity of said flowing liquid;

c. isolation means comprising a hollow housing for containing said beam and isolating said target from the flow of the liquid at levels other than said selected level while exposing it to said flowing liquid at said selected level, the upper end of the housing being secured to the upper end of the beam, the top of the target having a concave shape to maintain a substantially uniform clearance between the lower end of the housing and the upper surface of the target during displacement of said target;

d. velocity sensing means for sensing displacement of said flow sensing means said beam, target, isolation means, and velocity sensing means forming a probe for immersion in said flowing liquid;

e. second support means;

f. slidable support means for supporting said probe and varying the position of said probe, said slidable support means being slidably supported for vertical movement on said second support means;

g. means for displaying the output of said velocity sensing means as an indication of velocity;

h. means for detecting the position of said probe; i. means for indicating said position; and j. hoist means for raising and lowering said slidable support means to a desired position.

16. A liquid flow velocity measuring apparatus, comprising:

a. first support means;

b. a flow sensing target mounted on said first support means, positionable at a selected level in a flowing liquid for exposure to said flowing liquid and responsive to the velocity of said flowing liquid;

c. isolation means secured to said first support means for isolating said target from the flow of the liquid at levels other than said selected level while exposing it to said flowing liquid at said selected level, the outer cross-sectional dimensions of said target and isolation means being substantially the same;

d. velocity sensing means for sensing displacement of said target, said first support means, target, isolation means, and velocity sensing means forming a probe for immersion in said flowing liquid;

e. second support means;

f. sleeve means mounted on said second support means, disposed around said probe and closely conforming in dimension to the outer surface of said target and said isolation means for wiping said probe; and g. means secured to said probe and said second support means for sliding said probe through said sleeve means.

17. Apparatus as in claim 16, wherein the upper surface of the target is concave to maintain a substantially uniform clearance between the lower end of said isolation means and the upper surface of said target during the displacement of said target.

* * * * *